US012765547B2

(12) United States Patent
Ju et al.

(10) Patent No.: US 12,765,547 B2
(45) Date of Patent: Oct. 20, 2026

(54) DEGRADABLE NANO-PRESERVATIVE FILM WITH PHOTODYNAMIC BACTERICIDAL ACTIVITY AND PREPARATION METHOD THEREFOR

(71) Applicant: Qingdao Agricultural University, Qingdao (CN)

(72) Inventors: Jian Ju, Qingdao (CN); Jinglin Huang, Qingdao (CN); Qianyu Li, Qingdao (CN); Qingli Yang, Qingdao (CN); Guangjie Che, Qingdao (CN); Fangyuan Zhao, Qingdao (CN)

(73) Assignee: Qingdao Agricultural University, Qingdao (CN)

( * ) Notice: Subject to any disclaimer, the term of this patent is extended or adjusted under 35 U.S.C. 154(b) by 643 days.

(21) Appl. No.: 18/200,587

(22) Filed: May 23, 2023

(65) Prior Publication Data

US 2024/0206464 A1 Jun. 27, 2024

(30) Foreign Application Priority Data

Dec. 26, 2022 (CN) ......................... 202211672047.3

(51) Int. Cl.
*A01N 25/12* (2006.01)
*A01N 25/34* (2006.01)
(Continued)

(52) U.S. Cl.
CPC ............. *A01N 37/36* (2013.01); *A01N 25/12* (2013.01); *A01N 25/34* (2013.01); *A01N 43/90* (2013.01);
(Continued)

(58) Field of Classification Search
CPC ........... C09J 3/203; C09J 3/247; A01N 43/90; A01N 25/00; A01N 37/36; A01N 25/10; C08J 3/203; C08J 3/247
See application file for complete search history.

(56) References Cited

U.S. PATENT DOCUMENTS

2007/0292481 A1* 12/2007 Hoffman ............. A23C 19/086 426/660

FOREIGN PATENT DOCUMENTS

CN 101489404 A * 7/2009 ............. A23L 15/00
CN 102726504 A * 10/2012
(Continued)

OTHER PUBLICATIONS

Machine translation of Xiao (CN107675359), Feb. 9, 2018.*
(Continued)

*Primary Examiner* — Jun Li
(74) *Attorney, Agent, or Firm* — Bayramoglu Law Offices LLC

(57) ABSTRACT

A degradable nano-preservative film with photodynamic bactericidal activity and a preparation method therefor, and belongs to the technical field of antibacterial preservative films is provided. The present invention synthesizes nanoparticles with aggregation-induced emission characteristic by self-assembly of berberine that is a natural plant antibacterial component and citric acid. Under white light, the nanoparticles can generate a large amount of reactive oxygen species (ROS), thereby exhibiting efficient and durable antibacterial activity. Nanoparticles are prepared by adding the nanoparticles as a filler to a film-mixed solution composed of sodium alginate, pullulan and egg white. With photodynamic bactericidal activity, the present invention
(Continued)

improves over current antibacterial preservative films having short lasting effect and which require direct contact to realize bactericidal effect.

17 Claims, 3 Drawing Sheets
(3 of 3 Drawing Sheet(s) Filed in Color)

(51) Int. Cl.

| | |
|---|---|
| ***A01N 37/36*** | (2006.01) |
| ***A01N 43/90*** | (2006.01) |
| ***C08J 3/20*** | (2006.01) |
| ***C08J 3/24*** | (2006.01) |
| ***C08J 5/18*** | (2006.01) |

(52) U.S. Cl.
CPC ............... *C08J 3/203* (2013.01); *C08J 3/247* (2013.01); *C08J 5/18* (2013.01); *C08J 2305/00* (2013.01); *C08J 2405/04* (2013.01); *C08J 2491/00* (2013.01)

(56) References Cited

FOREIGN PATENT DOCUMENTS

| | | | | | |
|---|---|---|---|---|---|
| CN | 107675359 | A | * | 2/2018 | ........... D01D 5/0015 |
| CN | 111234365 | A | | 6/2020 | |
| CN | 113927965 | A | | 1/2022 | |
| CN | 114854100 | A | | 8/2022 | |
| WO | WO-2007149276 | A2 | * | 12/2007 | .............. A23P 20/18 |
| WO | WO-2008137832 | A1 | * | 11/2008 | ............. A23L 29/30 |

OTHER PUBLICATIONS

Han et al. (Characterization and film-forming mechanism of egg white/pullulan blend film, Food Chemistry 315 (2020) 126201).*

Ganduri et al. (Formulation of Pullulan/plasticizer blended films for their physical and biodegradability studies, Current Trends in Biotechnology and Pharmacy vol. 14 (4) 31-38, Jul. 2020).*

* cited by examiner

DEGRADABLE NANO-PRESERVATIVE FILM WITH PHOTODYNAMIC BACTERICIDAL ACTIVITY AND PREPARATION METHOD THEREFOR

CROSS REFERENCE TO RELATED APPLICATIONS

This application is based upon and claims priority to Chinese Application No. 202211672047.3 filed Dec. 26, 2022, the entire contents of which are incorporated by reference herein.

TECHNICAL FIELD

The present invention relates to the technical field of antibacterial preservative films, and in particular to a degradable nano-preservative film with photodynamic bactericidal activity and a preparation method therefor.

BACKGROUND

Microbial contamination is the main factor leading to food spoilage, which not only causes huge economic losses but also seriously threatens human health. Incorporation of antibacterial agents into film matrices is considered a promising approach to reducing food spoilage during transport or storage. Natural extracts and metal oxide nanoparticles are the main antibacterial substances added to active packaging. Among them, Ag nanoparticles, CuO nanoparticles and ZnO nanoparticles have been confirmed to have excellent antibacterial effects, however, these metal oxide nanoparticles have poor compatibility with a film matrix, and may also cause problems of threatening human health and polluting the environment. In contrast, natural plant extracts are considered to be an ideal source of antibacterial compounds because they are eco-friendly, relatively safe for humans and renewable. Unfortunately, the antibacterial activity of the plant extract is low, and a large amount of the extract is required to exhibit excellent antibacterial activity.

At present, for the market demand for degradable antibacterial preservative films, Chinese Patent No. CN113927965A prepares a photosensitive antibacterial preservative film based on nano-bacterial cellulose with nano-bacterial cellulose, carboxymethyl chitosan, a photosensitizer and citric acid. The problem of low antibacterial activity of the preservative film is solved in a targeted manner by combining the antibacterial activity of the carboxymethyl chitosan and the citric acid with the photosensitizer, however, the transparency and the mechanical property of the film are affected by adding various antibacterial components in the film matrix, so that the product quality cannot meet the market demand. Furthermore, the addition of a photosensitizer directly to the film matrix affects the physicochemical stability and bioavailability of the film. Chinese Patent CN114854100A prepares a nano-antibacterial preservative film with materials such as carboxymethyl chitosan, hydroxypropyl methylcellulose, nano-titanium dioxide modified oyster shell, graded nano-zinc oxide powder, nano-silicon dioxide, glycerol, gallic acid, sodium alginate and polyvinyl alcohol. This method improves the antibacterial activity of the film by combining various antibacterial components, however, the preparation process is complicated, and the transparency and the mechanical property of the film can be affected by adding various fillers into a film matrix. Chinese patent CN111234365A prepares a nanofiber antibacterial preservative film by EVOH nanofibers, PET nanofibers, plant essential oil inclusion compounds, quaternary ammonium salt chitosan and glycerol. Although the film has a better oxygen barrier property, the antibacterial durability and the transparency of the film are poorer, and the preparation process is complicated.

In summary, there is an urgent need for an efficient and simple preparation method that can improve the antibacterial durability of the preservative film without affecting the transparency and mechanical property of the film.

SUMMARY

An objective of the present invention is to provide a degradable nano-preservative film with photodynamic bactericidal activity and a preparation method therefor to solve the technical problem that the transparency and the mechanical property of the existing preservative film are affected when the antibacterial durability is improved.

In order to achieve the above objective, the present invention provides the following technical solutions.

The present invention provides a degradable nano-preservative film with photodynamic bactericidal activity, which is prepared from the following raw materials in parts by mass:

50-60 parts of pullulan;
30-40 parts of sodium alginate;
5-10 parts of egg white;
0.5-1.0 part of epoxidized soybean oil; and
0.4-0.8 part of nanoparticles;
wherein the nanoparticles are obtained by self-assembly of berberine and citric acid.

Further, a preparation method for the nanoparticles comprises the following steps:

1) adjusting a pH value of a solution of berberine in methanol and a pH value of a solution of citric acid in methanol to 7.0-8.0 with sodium hydroxide; and
2) mixing the solution of berberine in methanol and the solution of citric acid in methanol obtained in the step 1), adding the mixture into water, and stirring to obtain the nanoparticles.

Further, the solution of berberine in methanol has a concentration of 2-3 wt %, and the solution of citric acid in methanol has a concentration of 1-2 wt %.

Further, in the step 2), the solution of berberine in methanol, the solution of citric acid in methanol and water are in a volume ratio of 1-3:1-3:50-60.

Further, in the step 2), a temperature of water is 50-60° C., and the stirring is performed for 6-8 h.

The present invention provides a preparation method for the degradable nano-preservative film with photodynamic bactericidal activity, which comprises the following steps:

a. mixing the pullulan and the sodium alginate in water, and heating until the pullulan and the sodium alginate are dissolved to obtain a mixed solution;
b. mixing the epoxidized soybean oil in the mixed solution, then adding the egg white, and performing a crosslinking reaction to obtain a crosslinked product; and
c. mixing the crosslinked product with the nanoparticles to obtain the degradable nano-preservative film with photodynamic bactericidal activity.

Further, in the step a, the heating is performed at a temperature of 100-110° C.

Further, in the step b, the epoxidized soybean oil is mixed in the mixed solution at a temperature of 80-90° ° C. for 30-50 min.

Further, in the step b, the crosslinking reaction is performed at a temperature of 30-40° C. for 1-5 min.

The beneficial effects of the present invention are as follows.

The present invention prepares nanoparticles with aggregation-induced emission characteristic by self-assembly of berberine and citric acid, and the nanoparticles generate a large amount of reactive oxygen species (ROS) under white light, so that the antibacterial activity of the nanoparticles can be remarkably enhanced. Meanwhile, the nanoparticles improve the physicochemical stability and bioavailability of the berberine and the citric acid in the preservative film.

The strategy of applying the plant-derived nanoparticles with aggregation-induced emission characteristic and photodynamic bactericidal activity to the degradable preservative film breaks through the limitation that only an antibacterial agent can realize direct contact bactericidal in the prior art, and the antibacterial performance of the film is improved with visible light, which is a breakthrough of antibacterial packaging.

The berberine and the citric acid are crosslinked with egg white protein, so that the film-forming property of the film-mixed solution can be significantly improved, and the ductility of the film is increased. The plant-derived nanoparticles prepared by the present invention have the characteristics of safety, no toxicity and degradability. The present invention provides a simple and efficient preparation process for a green synthetic photodynamic bactericidal preservative film without adding any toxic substance.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Figure 1:
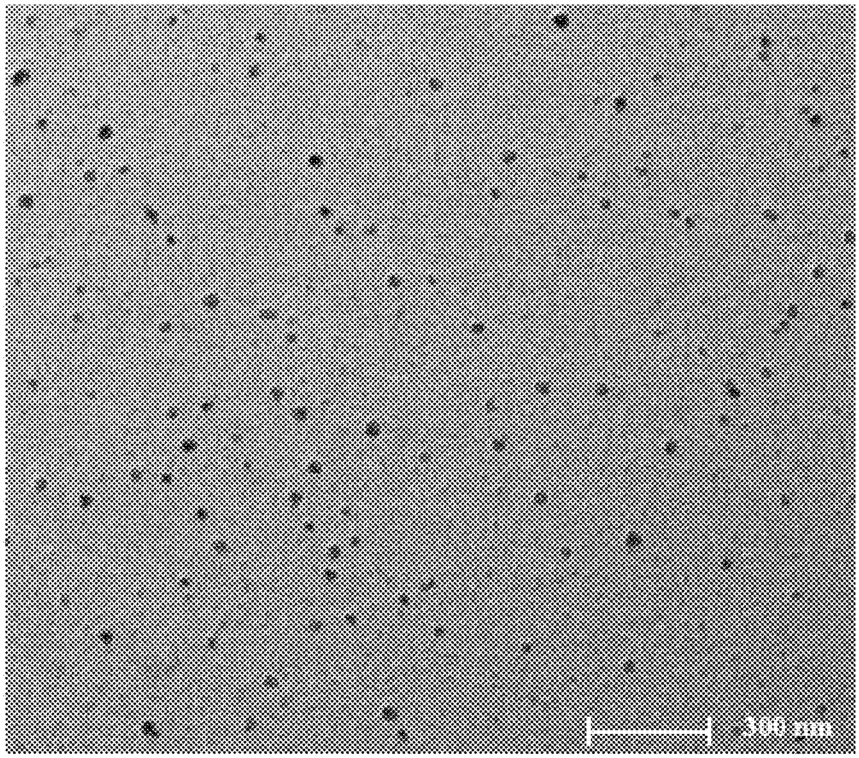
FIG. 1 is a transmission electron micrograph of nanoparticles obtained in Example 1 of the present invention.

The present invention provides a degradable nano-preservative film with photodynamic bactericidal activity, which is prepared from the following raw materials in parts by mass:

50-60 parts of pullulan;

30-40 parts of sodium alginate;

5-10 parts of egg white;

0.5-1.0 part of epoxidized soybean oil; and 0.4-0.8 part of nanoparticles;

wherein the nanoparticles are obtained by self-assembly of berberine and citric acid.

In the present invention, the addition amount of the pullulan is 50-60 parts by mass, preferably 52-58 parts by mass, and more preferably 55 parts by mass.

In the present invention, the addition amount of the sodium alginate is 30-40 parts by mass, preferably 32-38 parts by mass, and more preferably 35 parts by mass.

In the present invention, the addition amount of the egg white is 5-10 parts by mass, preferably 6-9 parts by mass, and more preferably 7-8 parts by mass.

In the present invention, the addition amount of the epoxidized soybean oil is 0.5-1.0 part by mass, preferably 0.6-0.9 part by mass, and more preferably 0.7-0.8 part by mass.

In the present invention, the addition amount of the nanoparticles is 0.4-0.8 part by mass, preferably 0.5-0.7 part by mass, and more preferably 0.6 part by mass.

In the present invention, the preparation method for the nanoparticles comprises the following steps:

1) adjusting a pH value of a solution of berberine in methanol and a pH value of a solution of citric acid in methanol to 7.0-8.0 with sodium hydroxide; and
2) mixing the solution of berberine in methanol and the solution of citric acid in methanol obtained in the step 1), adding the mixture into water, and stirring to obtain the nanoparticles.

In the present invention, the pH value of the solution of berberine in methanol and the pH value of the solution of citric acid in methanol is preferably adjusted to 7.5.

In the present invention, the concentration of the solution of berberine in methanol is 2-3 wt %, preferably 2.2-2.8 wt %, and more preferably 2.5 wt %; and the concentration of the solution of citric acid in methanol is 1-2 wt %, preferably 1.2-1.8 wt %, and more preferably 1.5 wt %.

In the present invention, in the step 2), the solution of berberine in methanol, the solution of citric acid in methanol and water are in a volume ratio of 1-3:1-3:50-60, preferably 1.5-2.5:1.5-2.5:52-58, more preferably 2:2:55.

In the present invention, in the step 2), the temperature of water is 50-60° C., preferably 52-58° C., and more preferably 55° C.; the stirring is performed for 6-8 h, preferably 7 h.

The present invention provides a preparation method for the degradable nano-preservative film with photodynamic bactericidal activity, which comprises the following steps:

a. mixing the pullulan and the sodium alginate in water, and heating until the pullulan and the sodium alginate are dissolved to obtain a mixed solution;
b. mixing the epoxidized soybean oil in the mixed solution, then adding the egg white, and performing a crosslinking reaction to obtain a crosslinked product; and
c. mixing the crosslinked product with the nanoparticles to obtain the degradable nano-preservative film with photodynamic bactericidal activity.

In the present invention, in the step a, the heating is performed at a temperature of 100-110° C., preferably 102-108° C., and more preferably 105° C.

In the present invention, in the step b, the epoxidized soybean oil is mixed in the mixed solution at a temperature of 80-90° C., preferably 82-88° C., and more preferably 85° C.; and the mixing is performed for 30-50 min, preferably 35-45 min, and more preferably 40 min.

In the present invention, in the step b, the crosslinking reaction is performed at a temperature of 30-40° C., preferably 32-38° C., and more preferably 35° C.; and the crosslinking reaction is performed for 1-5 min, preferably 2-4 min, and more preferably 3 min.

In the present invention, berberine (with a purity of more than or equal to 98%, solid particles) is provided by Shanghai Aladdin Biochemical Technology Co., Ltd.; and citric acid (with a purity of greater than 99.5%, solid particles) is provided by the Shanghai Macklin Biochemical Co., Ltd.

The technical solutions provided in the present invention will be described in detail below with reference to the examples, which, however, should not be construed as limiting the scope of the present invention.

Example 1

(1) Weighing berberine and citric acid, adding the berberine and the citric acid to a methanol solution to obtain 2 wt % of a solution of berberine in methanol and 1 wt % of a solution of citric acid in methanol; and adjusting a pH value of the solution of berberine in methanol and a pH value of the solution of citric acid in methanol to 7.0 with sodium hydroxide.
(2) Mixing and stirring the solution of berberine in methanol and the solution of citric acid in methanol in the step (1) at a temperature of 20° C. in a ratio of 1:1 (v/v), then adding 3 mL of a mixed solution into 50 mL of distilled water, wherein the temperature of the distilled water is kept at 50° C., and strongly stirring for 6 h to prepare the nanoparticles.
(3) Weighing 50 parts of pullulan and 30 parts of sodium alginate, adding into 200 parts of distilled water, and heating the mixture in a boiling water bath at 100° C. until the solute is completely dissolved to obtain a mixed solution.
(4) Mixing the mixed solution with 0.5 part of epoxidized soybean oil, stirring at 80° C. for 30 min, cooling to 30° C., adding 5 parts of egg white, and reacting for 5 min.
(5) Mixing a crosslinked product with 0.4 part of nanoparticles, stirring at 20° C. for 20 min to obtain a degradable nano-preservative film solution with photodynamic bactericidal activity, performing tape casting on the degradable nano-preservative film solution on an acrylic plate to form a film, and drying the film for later use.

Example 2

(1) Weighing berberine and citric acid, adding the berberine and the citric acid to a methanol solution to obtain 2.5 wt % of a solution of berberine in methanol and 1.5 wt % of a solution of citric acid in methanol; and adjusting a pH value of the solution of berberine in methanol and a pH value of the solution of citric acid in methanol to 7.5 with sodium hydroxide.
(2) Mixing and stirring the solution of berberine in methanol and the solution of citric acid in methanol in the step (1) at a temperature of 24° C. in a ratio of 1:1.5 (v/v), then adding 4 mL of a mixed solution into 55 mL of distilled water, wherein the temperature of the distilled water is kept at 55° C., and strongly stirring for 7 h to prepare the nanoparticles.
(3) Weighing 55 parts of pullulan and 35 parts of sodium alginate, adding into 200 parts of distilled water, and heating the mixture in a boiling water bath at 100° C. until the solute is completely dissolved to obtain a mixed solution.
(4) Mixing the mixed solution with 0.8 part of epoxidized soybean oil, stirring at 90° C. for 40 min, cooling to 35° C., adding 8 parts of egg white, and reacting for 5 min.
(5) Mixing a crosslinked product with 0.6 part of nanoparticles, stirring at 25° C. for 25 min to obtain a degradable nano-preservative film solution with photodynamic bactericidal activity, performing tape casting on the degradable nano-preservative film solution on an acrylic plate to form a film, and drying the film for later use.

Example 3

(1) Weighing berberine and citric acid, adding the berberine and the citric acid to a methanol solution to obtain 3 wt % of a solution of berberine in methanol and 2 wt % of a solution of citric acid in methanol; and adjusting a pH value of the solution of berberine in methanol and a pH value of the solution of citric acid in methanol to 8.0 with sodium hydroxide.
(2) Mixing and stirring the solution of berberine in methanol and the solution of citric acid in methanol in the step (1) at a temperature of 28° C. in a ratio of 1:2 (v/v), then adding 5 mL of a mixed solution into 60 mL of distilled water, wherein the temperature of the distilled water is kept at 60° C., and strongly stirring for 8 h to prepare the nanoparticles.
(3) Weighing 60 parts of pullulan and 40 parts of sodium alginate, adding into 200 parts of distilled water, and heating the mixture in a boiling water bath at 100° C. until the solute is completely dissolved to obtain a mixed solution.
(4) Mixing the mixed solution with 1.0 part of epoxidized soybean oil, stirring at 90° C. for 50 min, cooling to 40° C., adding 10 parts of egg white, and reacting for 5 min.
(5) Mixing a crosslinked product with 0.8 part of nanoparticles, stirring at 30° ° C. for 30 min to obtain a degradable nano-preservative film solution with photodynamic bactericidal activity, performing tape casting on the degradable nano-preservative film solution on an acrylic plate to form a film, and drying the film for later use.

Comparative Example 1

(1) Weighing 60 parts of pullulan and 40 parts of sodium alginate, adding into 200 parts of distilled water, and heating the mixture in a boiling water bath at 100° C. until the solute is completely dissolved to obtain a mixed solution.
(2) Mixing the mixed solution with 1.0 part of epoxidized soybean oil, stirring at 90° C. for 50 min, cooling to 40° C., adding 10 parts of egg white, and reacting for 5 min.
(3) Stirring a crosslinked product at 30° ° C. for 30 min to obtain a preservative film solution, and performing tape casting on the preservative film solution on an acrylic plate to form a film, and drying the film for later use.

The nanoparticle solution obtained in Example 1 was dropped on a conductive resin, dried in vacuum at room temperature, and then photographed by TEM, and it can be seen from FIG. 1 that most of the prepared nanoparticles were approximately uniform spherical particles with a size of about 40-50 nm.

Figure 2:
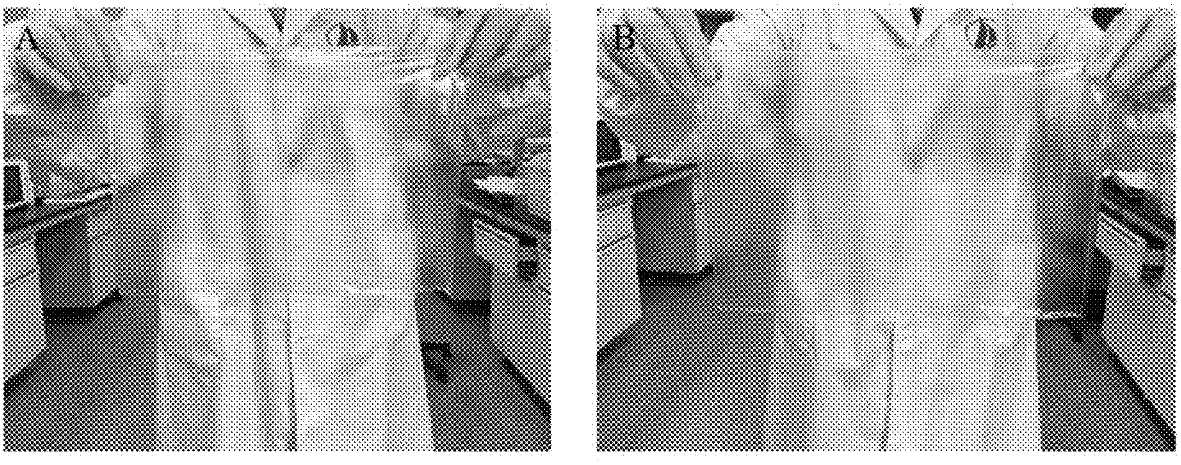
FIGS. 2A-2B are diagrams of the appearance of the preservative films prepared in Comparative Example 1 (FIG. 2A) and Example 3 (FIG. 2B)

In FIGS. 2A-2B, FIG. 2A shows the preservative film of Comparative Example 1 without the nanoparticles added, and FIG. 2B shows the nano-preservative film prepared in Example 3 of the present invention, it can be seen from FIGS. 2A-2B that the addition of nanoparticles has no effect on the transparency of the preservative film.

Figure 3:
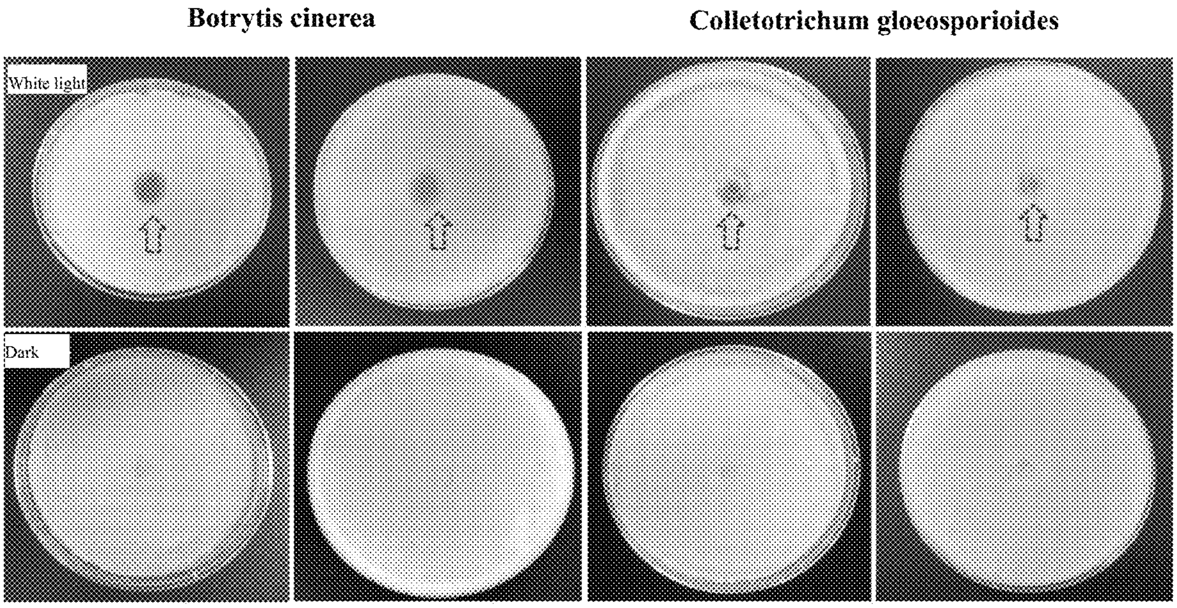
FIG. 3 is a comparative graph showing the antibacterial activity of the degradable nano-preservative film with photodynamic bactericidal activity prepared in Example 3 of the present invention.

In FIG. 3, the preservative film prepared in Example 3 was cut into a circle having a diameter of 0.6 cm, and then the preservative film was placed in the center of culture dishes filled with *Botrytis cinerea* and *colletotrichum gloeosporioides*. The culture dishes were incubated in white-light and dark environments at 28° ° C. for 72 h, and the antibacterial effect of the film was observed. It can be clearly seen from FIG. 3 that the nano-preservative film has a good inhibition effect on both *Botrytis cinerea* and *colletotrichum gloeosporioides* under white light.

Figure 4:
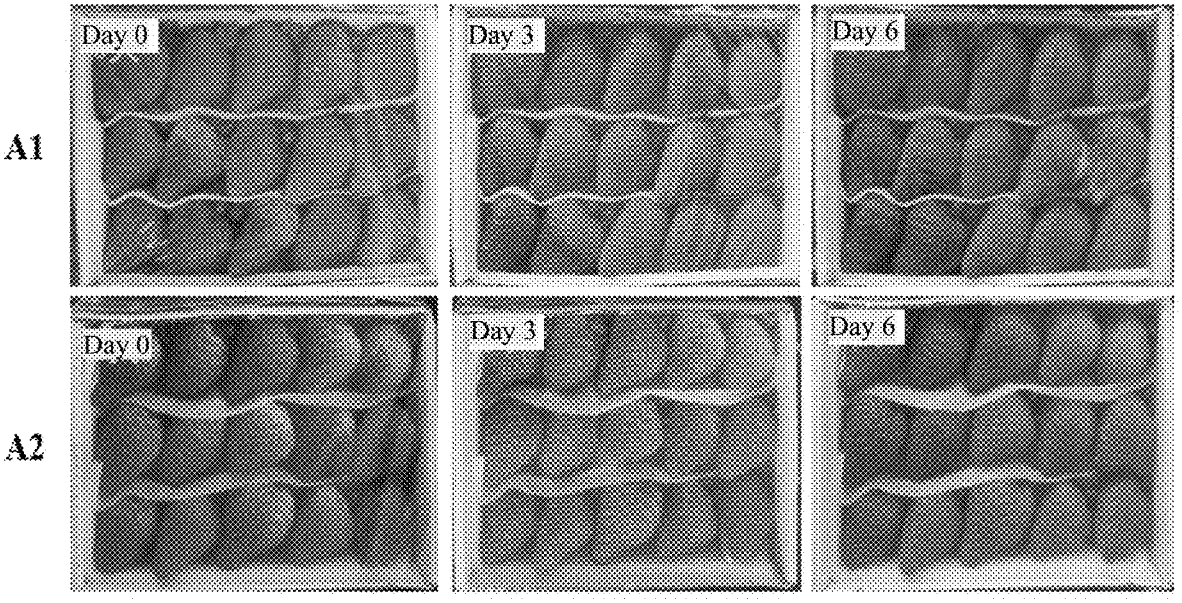
FIG. 4 is a comparative graph showing the preservation effect of the degradable nano-preservative film with photodynamic bactericidal activity prepared in Example 3 of the present invention on strawberries.

FIG. 4 is a comparison of the nano-preservative film (A2) prepared in Example 3 with a commercially available PE preservative film (A1). It can be clearly seen from FIG. 4 that the strawberries packaged with PE preservative film at 20° C. have already exhibited significant decay on day 6, while strawberries packaged with nano-preservative film still do not exhibit any decay on day 6.

Figure 5:
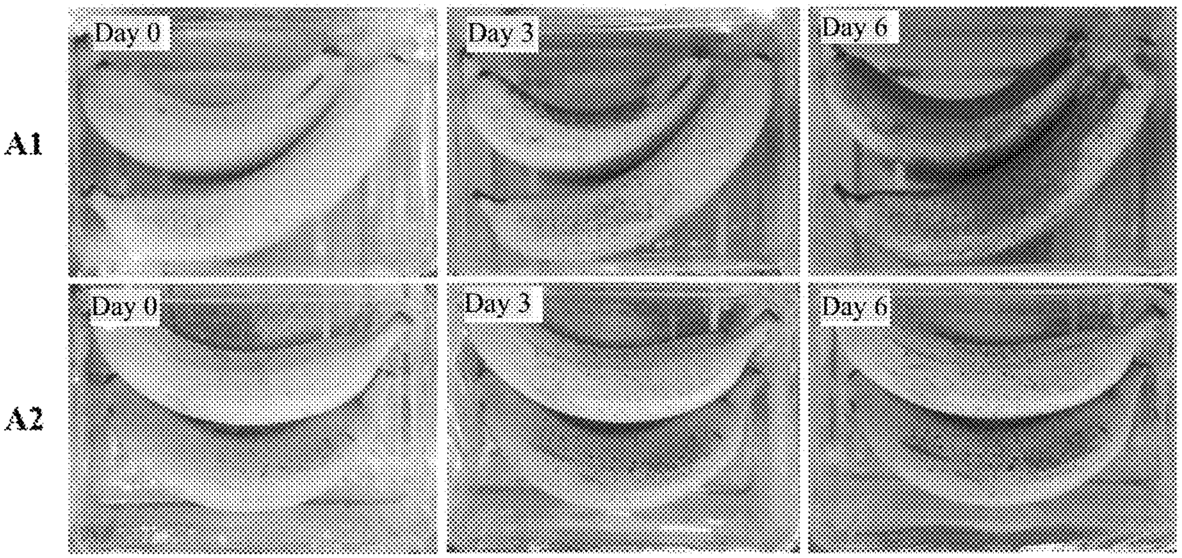
FIG. 5 is a comparative graph showing the preservation effect of the degradable nano-preservative film with photodynamic bactericidal activity prepared in Example 3 of the present invention on bananas.

FIG. 5 is a comparison of the nano-preservative film (A2) prepared in Example 3 with a commercially available PE preservative film (A1). The nano-preservative film in Example 3 is used to prolong the shelf life of bananas, and the nano-preservative film can significantly inhibit the browning rate of the bananas and has a good protection effect on the storage quality of the bananas.

According to the above examples, the present invention provides a degradable nano-preservative film with photodynamic bactericidal activity and a preparation method therefor. With photodynamic bactericidal activity, the present invention breaks through the bottleneck that the current antibacterial preservative film has short lasting action time and the limitation that only an antibacterial agent can realize direct contact bactericidal effect in the prior art. Meanwhile, the problem that the transparency and the mechanical property of the film are affected by adding excessive antibacterial components into the film matrix is effectively solved. In addition, the problem that the physicochemical stability and the bioavailability of a plant active ingredient or a photosensitizer are affected by directly adding the plant active ingredient or the photosensitizer into the film matrix is solved by preparing the nanoparticles through self-assembly. The degradable nano-preservative film with photodynamic bactericidal activity prepared by the present invention not only has high-efficiency and lasting antibacterial activity, good transparency and mechanical property, and a simple and convenient preparation process, but also is environmentally friendly and pollution-free. Compared with the commercially available PE preservative film, the degradable nano-preservative film with photodynamic bactericidal activity can effectively prolong the shelf life of fresh fruits and vegetables by more than 2-3 days. The nano-preservative film has a very wide application prospect in the field of fruit and vegetable preservation.

The above descriptions are only preferred embodiments of the present invention. It should be noted that those of ordinary skill in the art can also make several improvements and modifications without departing from the principle of the present invention, and such improvements and modifications shall fall within the protection scope of the present invention.

What is claimed is:

1. A degradable preservative film with photodynamic bactericidal activity, comprising a preservative film matrix and nanoparticles mixed with the preservative film matrix, wherein the degradable preservative film is prepared from raw materials in parts by mass, wherein the parts by mass are relative parts by mass of pullulan, sodium alginate, egg white, epoxidized soybean oil, and nanoparticles; the raw materials comprising:

50-60 parts of the pullulan;

30-40 parts of the sodium alginate;

5-10 parts of the egg white;

0.5-1.0 part of the epoxidized soybean oil; and 0.4-0.8 part of the nanoparticles;

wherein the nanoparticles are obtained by self-assembly of berberine and citric acid and have a particle size of 40-50 nm.

2. The degradable preservative film with photodynamic bactericidal activity according to claim 1, wherein a preparation method for the nanoparticles comprises the following steps:

1) Adjusting a pH value of a solution of berberine in methanol and a pH value of a solution of citric acid in methanol to 7.0-8.0 with sodium hydroxide; and 2) Mixing the solution of berberine in methanol and the solution of citric acid in methanol obtained in the step 1), adding the mixture into water, and stirring to obtain the nanoparticles.

3. The degradable preservative film with photodynamic bactericidal activity according to claim 2, wherein the solution of berberine in methanol has a concentration of 2-3 wt %, and the solution of citric acid in methanol has a concentration of 1-2 wt %.

4. The degradable preservative film with photodynamic bactericidal activity according to claim 3, wherein in the step 2), the solution of berberine in methanol, the solution of citric acid in methanol and water are in a volume ratio of 1-3:1-3:50-60.

5. The degradable preservative film with photodynamic bactericidal activity according to claim 4, wherein in the step 2), a temperature of water is 50-60° C., and the stirring is performed for 6-8 h.

6. A preparation method for the degradable preservative film with photodynamic bactericidal activity according to claim 1, comprising the following steps:

a) mixing the pullulan and the sodium alginate in water, and heating until the pullulan and the sodium alginate are dissolved to obtain a mixed solution;

b) mixing the epoxidized soybean oil in the mixed solution, then adding the egg white, and performing a crosslinking reaction to obtain a crosslinked product; and c) mixing the crosslinked product with the nanoparticles to obtain the degradable preservative film with photodynamic bactericidal activity.

7. The preparation method according to claim 6, wherein in the step a, the heating is performed at a temperature of 100-110° C.

8. The preparation method according to claim 6, wherein in the step b, the epoxidized soybean oil is mixed in the mixed solution at a temperature of 80-90° C. for 30-50 min.

9. The preparation method according to claim 8, wherein in the step b, the crosslinking reaction is performed at a temperature of 30-40° C. for 1-5 min.

10. The degradable preservative film with photodynamic bactericidal activity according to claim 2, wherein in the step 2), the solution of berberine in methanol, the solution of citric acid in methanol and water are in a volume ratio of 1-3:1-3:50-60.

11. The degradable preservative film with photodynamic bactericidal activity according to claim 10, wherein in the step 2), a temperature of water is 50-60° C., and the stirring is performed for 6-8 h.

12. The preparation method for the degradable preservative film with photodynamic bactericidal activity according to claim 6, wherein a preparation method for the nanoparticles comprises the following steps:

1) Adjusting a pH value of a solution of berberine in methanol and a pH value of a solution of citric acid in methanol to 7.0-8.0 with sodium hydroxide; and
2) Mixing the solution of berberine in methanol and the solution of citric acid in methanol obtained in the step 1), adding the mixture into water, and stirring to obtain the nanoparticles.

13. The preparation method for the degradable preservative film with photodynamic bactericidal activity according to claim 12, wherein the solution of berberine in methanol has a concentration of 2-3 wt %, and the solution of citric acid in methanol has a concentration of 1-2 wt %.

14. The preparation method for the degradable preservative film with photodynamic bactericidal activity according to claim 12, wherein in the step 2), the solution of berberine in methanol, the solution of citric acid in methanol and water are in a volume ratio of 1-3:1-3:50-60.

15. The preparation method for the degradable preservative film with photodynamic bactericidal activity according to claim 12, wherein in the step 2), a temperature of water is 50-60° C., and the stirring is performed for 6-8 h.

16. The preparation method according to claim 7, wherein in the step b, the epoxidized soybean oil is mixed in the mixed solution at a temperature of 80-90° C. for 30-50 min.

17. The preparation method according to claim 16, wherein in the step b, the crosslinking reaction is performed at a temperature of 30-40° C. for 1-5 min.

* * * * *